United States Patent [19]

Martin

[11] 4,028,474

[45] June 7, 1977

[54] WEATHERPROOF DECAL

[76] Inventor: Francois Martin, c/o Ste d'Exploitation des Procedes F. Martin dite SEPMA, Oursbelille 65 490, France

[22] Filed: Mar. 1, 1976

[21] Appl. No.: 662,547

Related U.S. Application Data

[63] Continuation of Ser. No. 430,488, Jan. 3, 1974, abandoned.

[30] Foreign Application Priority Data

Jan. 3, 1973 France .............................. 73.00529

[52] U.S. Cl. .................................. 428/40; 156/234; 156/240; 427/152; 428/202; 428/204; 428/207; 428/212; 428/352; 428/354; 428/914

[51] Int. Cl.[2] ....................... B32B 3/22; B32B 7/02; B32B 7/06; B32B 7/14; C09J 7/02

[58] Field of Search ........... 427/152; 156/234, 240; 428/40, 202, 204, 207, 212, 352, 354, 914

[56] References Cited

UNITED STATES PATENTS

| | | | |
|---|---|---|---|
| 2,496,325 | 2/1950 | Wittgren | 428/40 |
| 2,626,226 | 1/1953 | Adair | 428/40 |
| 3,065,120 | 11/1962 | Avelar | 428/40 |
| 3,459,626 | 8/1969 | Morgan | 428/40 |

FOREIGN PATENTS OR APPLICATIONS

| | | | |
|---|---|---|---|
| 589,276 | 12/1959 | Canada | 428/198 |

*Primary Examiner*—J.C. Cannon

*Attorney, Agent, or Firm*—W. G. Fasse; W. W. Roberts

[57] ABSTRACT

A weatherproof decal employs an adhesive coating to hold the lettering or the like to a smooth surface. The adhesive coating covers the lettering and the spaces between the lettering. A further adhesive layer employing the same adhesive agent is present only in the area of the lettering in direct contact with the adhesive coating. The adhesive layer has an adhesive strength larger than that of the coating which holds the lettering. The adhesive strength is controlled by admixing talcum and a mineral oil to the adhesive agent.

7 Claims, 1 Drawing Figure

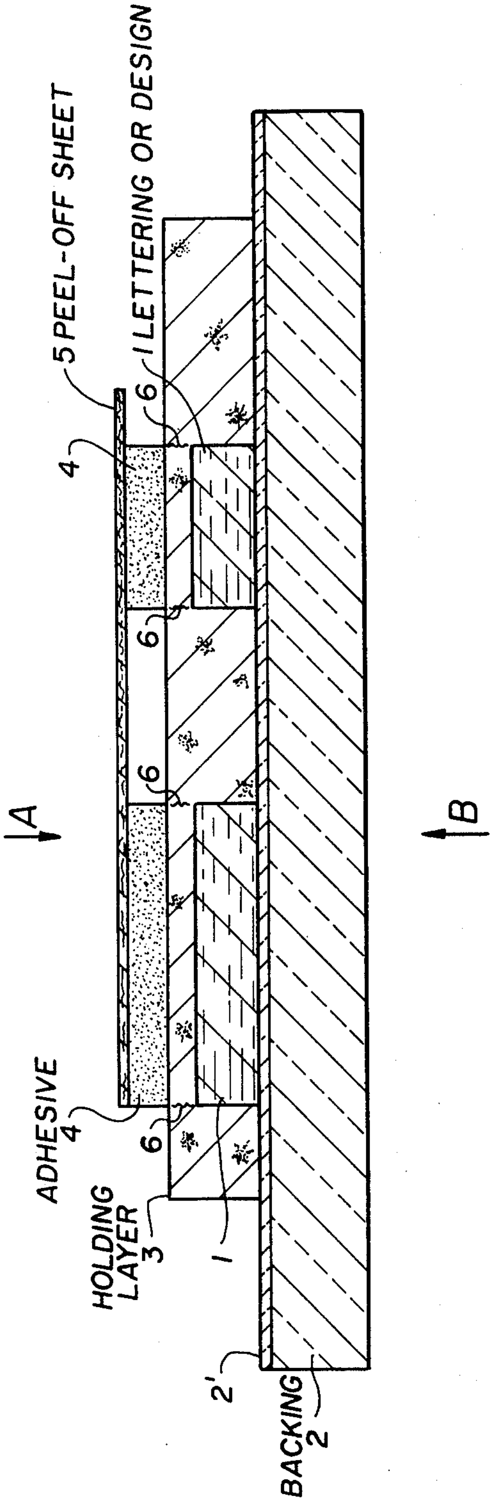
5 PEEL-OFF SHEET
1 LETTERING OR DESIGN
4
6
6
6
A
B
ADHESIVE 4
6
HOLDING LAYER 3
1
2'
BACKING 2

WEATHERPROOF DECAL

This is a continuation of application Ser. No. 430,488 filed on Jan. 3, 1974 and now abandoned.

BACKGROUND OF THE INVENTION:

The present invention relates to instantly transferable text or design labels or decals in a substantially dry fashion on any suitable surface and without leaving a trace of glue or paint or any other support for the lettering of the text or design on the surface to be labeled or decorated.

In the prior art the letters or designs were painted directly onto the surface to be labeled or decorated. To perform this work, even if it was done with a template, a skilled person was required. Further, it took substantial time to perform this work and to let the paint dry.

It is also known to provide cut-out or shaped lettering and/or designs with an adhesive on the back surface thereof for attaching the lettering to any surface. However, it is difficult to apply these letterings and/or designs individually to the desired surface, especially when the letters are of very small dimensions. Further difficulties are encountered when the surface, to which the lettering and/or designs are to be applied, is not flat and smooth but rather curved. Further, the components of which these lettering and/or design materials were made did not retain their characteristic features and their shape, especially under adverse weather conditions under which the glue or adhesive would not remain effective over prolonged periods of time.

Furthermore, prior art labeling or lettering material, especially when they were printed on paper, used to require a delicate handling because these materials are fragile and not weather resistant. Accordingly, these materials would frequently break, even before the transfer. As a result, where such prior art materials have been used heretofore, the finished work frequently was subject to objections and complaints.

OBJECTS OF THE INVENTION:

In view of the above, it is the aim of the invention to avoid the difficulties outlined above, more specifically, the invention aims at providing instantly transferable decals, labels, or the like which are easily attachable to most any suitable surface, to provide decals, labeling or decorating materials, which will permit the transfer of letters without any support or backing remaining on the surface to which these materials are applied;

to provide decal or labeling means, which will retain their shape and position under any weather conditions, and to assure that subsequent to the transfer of the material onto the surface to be labeled or decorated, all so called "fonds", supporting means, or similar means for the individual letters or designs are avoided.

SUMMARY OF THE INVENTION:

According to the invention there is provided decals, labels, or the like, wherein the lettering or designs are printed in reverse fashion on a backing sheet, for example by silk-screen printing methods, offset printing, or any other suitable printing procedures. The printing material may, depending on the desired use, be an ink, especially a weather resistant ink, a paint, or any other synthetic product or natural material suitable for the printing purpose. The backing is provided with a smooth surface, such as a silicon or paraffin or wax film, so that the printing will not penetrate into the backing surface and so as to facilitate the removal of the backing sheet.

The material imprinted on the backing sheet, after it is dried and solidified, is coated with a holding or anchoring film which will also cover the spaces between the lettering or designs. This film may, for instance, be rolled-on. On top of the holding film, adhesive is applied in the areas defined by the lettering and/or designs. If desired, the adhesive may be provided with a protective peel-off layer.

BRIEF FIGURE DESCRIPTION:

In order that the invention may be clearly understood, it will now be described by way of example, with reference to the FIGURE of the accompanying drawing, which shows:

a sectional view through a decal, label or the like according to the invention on a substantially enlarged scale.

DESCRIPTION OF EXAMPLE EMBODIMENT:

Referring to the sectional view shown in the drawing, there is illustrated a backing 2 which may, for example, be a sheet of transparent or translucent polyethylene. The backing 2 is provided with a smooth surface 2', for example, a film of silicone, paraffin, wax or the like.

On the top of the smooth surface 2' of the backing 2, there is imprinted a lettering and/or design 1, for example, by means of silk-screen printing, offset printing, or any other suitable manner, for example painting. Depending on the purpose of the decal, or the desired result, the lettering or imprint or design 1 may be ink, paint, or any other synthetic or natural material which, for example, may be weatherproof. An ink of suitable type is known under the trade name "ARS" produced by the Tiflex Company at Poncin (France).

After the lettering or design 1 has dried and solidified, a holding means in the form of an anchoring layer 3 is applied over the lettering and to the areas between lettering so as to cover the lettering and the smooth surface simultaneously. If desired, the margins around the lettering and/or design may be left uncovered by the holding layer. Such uncovered spaces may be used for printing information on the backing sheet 2, for example, advertising material or other information. The holding or anchoring layer 3 may also be applied by silk-screen printing methods or by a roll-on method. A suitable material to form the anchoring layer 3 may, for example, be composed from 430 grams of mineral oil, 345 grams of talc or talcum powder, and 325 grams of a permanent adhesive known under the trade name "572", produced by the "Rhone Aquitaine Chimie" in Toulouse (France).

After the holding or anchoring layer 3 has dried an adhesive, preferably a permanent, weather resistant adhesive 4, is applied in the areas defined by the lettering or design 1. This adhesive 4 may also be applied by silk-screen methods or by means of respective templates. Incidentally, templates may be used where suitable in the present process steps. The adhesive 4 should be a strong adhesive, such as that known under the trade name "572" produced by the above named company "Rhone Aquitaine Chimie". If desired, the adhesive may be protected after it has dried and until the use of the decal or label by a sheet of silicone paper 5 or the like which is peeled-off prior to the use of the decal. The adhesive 4 has an adhesive strength larger than the holding means 3.

Although it is preferable to provide the holding or anchoring layer 3 as a continuous, uninterrupted layer in which the lettering or design is embedded, it is also possible to provide the anchoring simply by strips or grids of the holding material described above in connection with the holding layer 3. In any event, the space around the holding means 3 may be used for identification markings, advertisings, or the like. Where the holding means 3 are provided in the form of parallel strips or in a grid or other pattern, a decorative effect may be achieved, however, it will be appreciated that the coherence of the entire structure is better when the holding means 3 form an uninterrupted layer.

The present decal material is used by simply peeling-off the protective layer 5 and pressing the material onto the surface which is to be decorated, labeled or the like. Thereafter, the backing 2 is removed whereby the holding layer 3 is also removed in the areas outside the lettering or design 1. In other words, only the holding material between the lettering 1 and the adhesive 4 will remain and all other traces are removed along with the backing 2. For this purpose, the tearing will be substantially along the margins of the lettering or design, as indicated at 6 in the drawing. This removal of the holding means 3 along with the backing 2 is possible, because according to the invention the holding means 3 stick to the surface 2′ sufficiently to permit said tearing. This feature of the invention has the advantage that the finished labeling or design has the appearance as if it had been individually printed or painted, because all traces of a coherence between the individual elements of the lettering or markings have been removed with the removal of the backing 2.

It is also possible to employ an adhesive 4 which normally is inert and which is only activated at the time of the application of the decal, for example, by pressure activation or by applying of moisture as is well known in the art.

Another advantage of the present invention is seen in that it results in a decal which may be easily used and the printing may be accomplished with ink and very good paints which have not only a good esthetic appearance, but also are resistant to weather and other conditions.

The present invention may be employed in connection with marking or labeling all vehicles, such as land vehicles, air crafts, and boats as well as machines for indicating or identifying purposes, it may also be employed for signaling panels, road markings, for advertising purposes, for exmaple in department stores and the like. It may be applied on stone, metal, concrete, glass, even on tissue, on synthetic materials and on flat as well as irregular or curved surfaces.

Incidentally, the term "in reverse fashion" as used above, means that the lettering will appear as a mirror image when viewed in the direction of the arrow A, but in normal fashion or image when viewed in the direction of the arrow B.

Although the invention has been described with reference to specific example embodiments, it will be appreciated, that it is intended to cover all modifications and equivalents within the scope of the appended claims.

1. A decal comprising a backing with a smooth surface, lettering or designs of given contours placed on said smooth surface preferably in reverse fashion, anchoring means comprising a substantially dried adhesive material, and anchoring means covering said lettering or designs and said smooth surface, an edge of reduced thickness in said anchoring means, said edge extending at said contours of the lettering or designs, said anchoring means securing the lettering or designs to said smooth surface and in position relative to each other, and an adhesive layer covering said anchoring means only in the areas of said lettering or designs, said adhesive layer and said anchoring means being composed of the same adhesive agent, said adhesive layer having a greater adhesive strength than said anchoring means due to the dispersion of talcum and a mineral oil in the composition of the anchoring means and not in the adhesive layer, whereby the adhesive layer sticks more strongly than the anchoring means to facilitate the ripping of the anchoring means along said edge when the decal is transferred from the backing to a surface.

2. The decal according to claim 1, further comprising a peel-off sheet on said adhesive layer.

3. The decal according to claim 1, wherein said backing is transparent or translucent.

4. The decal according to claim 1, wherein said smooth surface comprises a coat selected from the group consisting of silicon, paraffin, and wax.

5. The decal according to claim 1, wherein said lettering or designs comprise several colors.

6. The decal according to claim 1, wherein said anchoring means comprise a continuous film.

7. The decal according to claim 1, wherein said anchoring means comprise a predetermined pattern.

* * * * *